United States Patent
Andrews et al.

(10) Patent No.: US 7,065,046 B2
(45) Date of Patent: Jun. 20, 2006

(54) SCALABLE WEIGHT-BASED TERABIT SWITCH SCHEDULING METHOD

(75) Inventors: Daniel M. Andrews, New Providence, NJ (US); Kameshwar V. Munagala, Stanford, CA (US); Aleksandr Stolyar, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1038 days.

(21) Appl. No.: 09/827,999

(22) Filed: Apr. 6, 2001

(65) Prior Publication Data

US 2003/0031193 A1    Feb. 13, 2003

(51) Int. Cl.
*G01R 31/08* (2006.01)
*H04L 12/26* (2006.01)

(52) U.S. Cl. .................. 370/230; 370/229; 370/412; 370/413; 370/397; 370/398; 370/396; 370/429

(58) Field of Classification Search ............... 370/229, 370/412, 413, 414, 415, 416, 417, 418, 419, 370/230, 397, 398, 399, 231, 395.1, 396, 370/428, 429
See application file for complete search history.

(56) References Cited

U.S. PATENT DOCUMENTS

| | | | |
|---|---|---|---|
| 5,255,265 A | 10/1993 | Eng et al. | |
| 5,299,190 A | 3/1994 | LaMaire et al. | |
| 5,500,858 A * | 3/1996 | McKeown | 370/412 |
| 5,831,980 A | 11/1998 | Varma et al. | |
| 5,923,644 A * | 7/1999 | McKeown et al. | 370/230 |
| 5,959,993 A | 9/1999 | Varma et al. | |
| 6,072,772 A * | 6/2000 | Charny et al. | 370/229 |
| 6,128,666 A | 10/2000 | Muller et al. | |
| 6,359,861 B1 * | 3/2002 | Sui et al. | 370/230 |
| 6,477,169 B1 * | 11/2002 | Angle et al. | 370/395.42 |
| 6,667,984 B1 * | 12/2003 | Chao et al. | 370/414 |
| 6,757,246 B1 * | 6/2004 | Alasti et al. | 370/230 |
| 6,915,372 B1 * | 7/2005 | Magill et al. | 710/317 |

* cited by examiner

*Primary Examiner*—Wellington Chin
*Assistant Examiner*—Chuong Ho (57) ABSTRACT

A method and apparatus are disclosed for scheduling arriving data packets for input to a switch having a plurality of input channels, and a plurality of output channels, the scheduling method is performed in successive scheduling phases where each scheduling phase further comprises at least log N scheduling iterations. The method is a parallelized weight-driven input queued switch scheduling algorithm which possesses good bandwidth and delay properties, is stable, and can be configured to offer various delay and quality of service (QoS) guarantees. The scheduling method utilizes envelope scheduling techniques and considers partially filled envelopes for scheduling.

16 Claims, 10 Drawing Sheets

FIG. 1

FIG. 4
SYMMETRIC TRAFFIC
ENVELOPE = 1500 BYTES

FIG. 5
SKEWED TRAFFIC
ENVELOPE = 1500 BYTES

FIG. 8
SKEWED TRAFFIC
ENVELOPE = 6000 BYTES

FIG. 9
SKEWED TRAFFIC
ENVELOPE = 1500 BYTES

FIG. 12
SKEWED TRAFFIC
ENVELOPE = 3000 BYTES

FIG. 13
SYMMETRIC TRAFFIC
ENVELOPE = 6000 BYTES

SCALABLE WEIGHT-BASED TERABIT SWITCH SCHEDULING METHOD

BACKGROUND OF THE INVENTION

1. Field of the Invention

The invention relates generally to the forwarding of data packets through a high bandwidth multiport switch. More particularly, the invention describes a weight-based switch scheduling algorithm for scheduling variable-length data packet streams.

2. Description of the Related Art

Traditional maximal size matching based input queued switch scheduling algorithms do not work very well at high line rates, as they need to schedule at the rate of the smallest packet size in the system. The present invention provides a weight-based and highly parallelizable scheduling algorithm which is stable for various traffic patterns and can offer strong QoS guarantees.

It is instructive to first consider the benefits and drawbacks associated with prior art maximal size and weight based switching algorithms to more fully appreciate the weight-based switching algorithm of the present invention. Although the term "maximal match" (or, alternatively, "maximal matching") is well understood by those skilled in the art, a definition may be had with reference to papers by N. McKeown et al. and Stiliadis et al., as well as U.S. Pat. No. 5,517,495 to Lund et al. In maximal size matching, a scheduling algorithm attempts to maximize the number of connections made in each cell time, and hence maximize the instantaneous allocation of bandwidth. A drawback associated with the algorithm is that when traffic is non-uniform, tie algorithm cannot sustain very high throughput. This occurs because the algorithm does not consider the backlog of cells in the VOQs, or the time that cells have been waiting in line to be served.

To overcome these drawbacks, a well known maximal size matching algorithm, referred to in the literature as ISLIP, has been developed. The ISLIP scheduling algorithm achieves high throughput (i.e., keeps the backlog low), is starvation free (i.e., does not allow a non-empty virtual output queue (VOQ) to remain unserved indefinitely), and is fast and simple to implement in hardware. Virtual Output queueing is a particular type of buffering strategy used at each input port of an input-queued switch whereby instead of maintaining a single FIFO queue for all cells, each input port maintains a separate queue for each output port of the switch. In this manner, head-of-line blocking problems are eliminated The Islip algorithm is based on the Parallel Iterative Matching algorithm (PIM) developed by DEC Systems Research Center for the 16-port, 1 Gb/s AN2 switch. PIM attempts to quickly converge on a conflict-free maximal match in multiple scheduling iterations, where each scheduling iteration includes the three steps described below. In the PIM approach, all inputs and outputs are initially unmatched and only those inputs and outputs not matched at the end of one scheduling iteration are eligible for matching in the next. The three steps operate in parallel on each output and input and are as follows:

Step 1; Request—each unmatched input sends a request to every unmatched output for which it has a queued cell.

Step 2: Grant—if an unmatched output receives any requests, it grants to one request by randomly selecting a request uniformly over all requests.

Step 3: Accept—if an input receives multiple grants, it accepts one grant by selecting an output randomly from among those outputs from which it receives grants.

By considering only unmatched inputs and outputs, each scheduling iteration only considers connections not made by earlier scheduling iterations. A drawback associated with the PIM approach is that utilizing a random approach is difficult and expensive to implement at high speed: each arbiter must make a random selection among the members of a time-varying set. Second, when the switch is oversubscribed, PIM can lead to unfairness between connections. Further, PIM does not perform well for a single scheduling iteration in that it limits the throughput to approximately 63%, only slightly higher than for a FIFO switch.

Islip overcomes these shortcomings by utilizing a simple variation of a round-robin matching (RRM) algorithm. The Islip approach overcomes two problems in PIM, namely, complexity and unfairness. The Islip algorithm, like PIM, consists of three steps. The three steps of arbitration are:

Step 1: Request—each unmatched input sends a request to every unmatched output for which it has a queued cell.

Step 2: Grant—if an output receives any requests, it chooses the one request that appears next in a fixed, round-robin schedule starting from the highest priority elements. The output notifies each input whether or not its request was granted. In a first iteration, a pointer to the highest priority element of the round-robin schedule is incremented (modulo N) to one location beyond the granted input, if and only if the grant is accepted in Step 3.

Step 3: Accept—if an input receives multiple grants it accepts the one grant that appears next in a fixed, round-robin schedule starting from the highest priority elements.

While Islip offers the advantages of high throughput, starvation free inputs, and easy implementation in hardware, which overcome the disadvantages associated with PIM, both Islip and PIM are members of a class of traditional input queued maximal size switching algorithms which are based on the premise that scheduling is performed at the granularity of the smallest packet size in the network. For IP network applications, where the size of the smallest packet is around 50 bytes, each scheduling step must operate in around 10 nanoseconds for line speeds on the order of 40 Gbps. This time will get smaller as line speeds increase. For a typical present generation high speed switch, the line speed at each port is around 2.5 Gbps (OC-48). As hardware speeds are scaling more slowly than optical line speeds, it becomes increasingly impractical to deploy maximal size matching algorithms to schedule at the granularity of 50 bytes.

One proposed solution to eliminate the problems associated with scheduling at the granularity of 50 bytes as line speeds increase into the terabit range is to utilize envelope scheduling. In this approach a scheduler attempts to schedule as many arriving packets as possible in fixed time intervals where each interval is referred to as an envelope time. In this approach, the scheduler waits for an envelope at the head of a virtual queue to receive all arriving packets in each envelope time. A typical fixed envelope time may be, for example, two microseconds. Given the variability in packet arrivals at an input port an envelope will under certain conditions contain less packets than it could accommodate. This presents a drawback in that the available bandwidth is underutilized whereby a lesser number of packets are transmitted in an envelope time than could otherwise be transmitted if the envelope was full.

Another class of scheduling algorithms, referred to as maximum weight matching algorithms, assign a weight for every input-output pair based on some criteria like the size of the VOQ for that pair, or the delay of the head of line packet in that VOQ. One drawback associated with a maximum weight matching is that it is computationally expensive. Several heuristics exist to approximate its weight. One approximation is the Greedy algorithm. In the Greedy algorithm, the unmatched input-output pair of largest weight is repeatedly found and matched. The weight of this matching is at least half of the maximum weight matching. Up until this point maximum weight matching algorithms, such as the Greedy algorithm, have not been considered for a number of reasons: (1) line speeds have been slow enough that it was practical to run scheduling algorithms like Islip at the granularity of the smallest packet size in the system, (2) weight-based schemes require computation of weights and maintenance of state which is more than one bit for every queue (3) the algorithms are inherently sequential in nature, which is undesirable for a hardware implementation.

It is no longer practical to run scheduling algorithms like Islip at the granularity of the smallest packet size in the network. This approach will not scale for the next generation of IP networks running at terabit speeds. While fixed size envelope scheduling is more feasible in such situations, Islip and its variants employing envelope scheduling are either unstable, or have very poor delay properties.

While maximum weight matching algorithms offer a partial solution, they do not readily lend themselves to hardware implementations as they are sequential in nature.

It is noted that the paper by Nick Mckeown, "Scheduling Algorithms for Input-Queued Cell Switches", discusses a parallel implementation of a maximum weight matching algorithm. However, the paper does not address the parallel implementation of a weight-based technique to large envelopes as disclosed by the present invention.

Accordingly, there remains a need for a parallel implementation of a maximum weight matching algorithm that is similar to Islip and is simple to implement in hardware. Further, the maximum weight matching algorithm should be stable (i.e. good delay properties) and scalable to operate in next generation IP networks running at terabit speeds.

SUMMARY OF THE INVENTION

According to the present invention, an improved scheduling algorithm is provided which overcomes the limitations of the prior art. A parallelized weight-driven input queued switch scheduling algorithm is provided which possesses good bandwidth and delay properties, is stable, and can be configured to offer various delay and quality of service (QoS) guarantees. The scheduling algorithm of the present invention utilizes envelope scheduling, however, the scheduling algorithm of the present invention does not wait for an envelope at the head of a virtual queue to completely fill up before taking it into consideration for scheduling. That is, partial envelopes are candidates for scheduling.

The scheduling algorithm of the present invention attempts to quickly converge on a conflict-free maximal match in log N scheduling iterations. In the present inventive algorithm, all inputs and outputs are initially unmatched and only those inputs and outputs not matched at the end of one scheduling iteration are eligible for matching in the next, similar to that described above with respect to PIM and Islip. The arbitration steps in each scheduling iteration of the present invention are as follows:

Step 1: Request—each unmatched input sends a request to a single unmatched output having the highest calculated weight there-between.

Step 2: Grant—each output looks at each received input request and accepts the input request having the highest weight.

By considering only unmatched inputs and outputs, each scheduling iteration only considers connections not made by earlier scheduling iterations.

The computed weight is based on two factors: the current size of the virtual output queue (VOQ) for the input-output pair and the delay of the head of the line (HOL) packet in the VOQ, defined herein as qlength and qdelay, respectively.

An advantage of using a weighting scheme is that the scheme can be adjusted to be different functions of queue length and queue delay giving various tradeoffs for QoS properties.

The present invention achieves several important goals. It is stable for all types of port loading. Delay and QoS guarantees can be offered by appropriate choice of weights. The scheduling method need not be run at the granularity of the smallest packet size. Instead, fixed size envelopes can be scheduled where the envelope size could be large. The algorithm is readily implementable in currently available hardware.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, where.

DETAILED DESCRIPTION OF THE PREFERRED EMBODIMENTS

In the disclosed scheduling method of the present invention, a matching of inputs to outputs is determined in a series of scheduling phases, also referred to as matching phases. The goal of the scheduling method of the present invention is to compute a maximal (conflict-free) match between the input and output channels in each scheduling phase. In one embodiment, each scheduling phase is preferably run for log N scheduling iterations wherein a single input-output pair is matched in each scheduling iteration.

Figure 1:
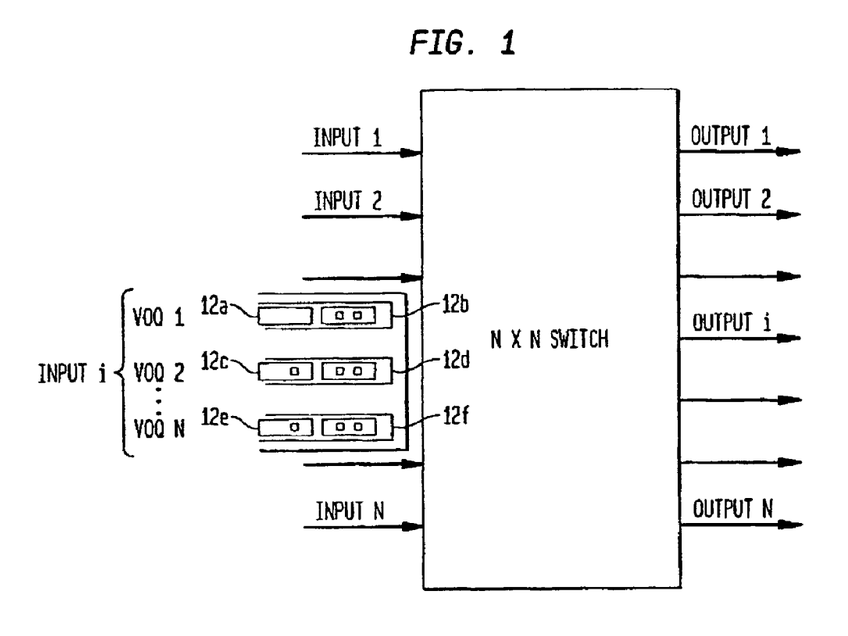
FIG. 1 is a diagram illustrating an N×N switch according to the present invention.

An input-queued packet switch is shown in FIG. 1 in simplified block diagram form. The architecture includes N input ports, 1 through N, an N×N switch having both N switch input ports and N switch output ports. It should be noted that N is a positive integer greater than 1. In FIG. 1, elements of only the ith input port are shown to promote clarity of presentation and understanding. As previously described, the N×N switch utilizes virtual output queueing (i.e., voq 1, voq 2, . . . , voq N) as a buffering strategy at each input port instead of maintaining a single FIFO queue for all cells, each input port maintains a separate queue for each output port of the switch. In this manner, head-of-line blocking problems are eliminated. Further, each virtual output queue utilizes envelope scheduling 12a–12f. In contrast to the prior art, however, the envelope scheduling method of the present invention does not wait for the envelope at the head of a virtual queue to fill up before taking it into consideration for scheduling. During each scheduling phase, the scheduling algorithm of the present invention attempts to quickly converge on a conflict-free maximal match of one or more of the N inputs with the N outputs in log N scheduling iterations. Each scheduling iteration includes performing the following two steps:

Step 1: Request—each unmatched input sends a request to a single unmatched output having the highest calculated weight therebetween.

Step 2: Grant—each output looks at each received input request and accepts the input request having the highest weight.

At the completion of each scheduling phase, an envelope is transmitted from each input to each matched output. By considering only unmatched inputs and outputs, each scheduling iteration only considers connections not made by earlier scheduling iterations.

In each scheduling iteration, an input is considered to be eligible to be matched as long as its envelope is non-empty. In contrast to the envelope scheduling schemes of the prior art which only consider full envelopes for scheduling. In the prior art approach, a scheduler waits for an envelope at the head of a virtual queue (VOQ) to fill up before taking it into consideration for scheduling. By contrast, in accordance with the method of the present invention, all non-empty (i.e., partially filled) envelopes are candidates for scheduling resulting in better delay properties than the prior art full envelope approach. Also, the algorithm's performance is relatively unaffected by variable packet sizes, as consideration is given only to the total number of bytes in each VOQ irrespective of whether it is full or not.

It is noted that in accordance with the described steps, the algorithm of the present invention is essentially a parallelized version of the greedy algorithm described above. The greedy algorithm may be characterized as a sequential algorithm. In each scheduling iteration of the greedy algorithm each input computes a highest calculated weight for various outputs. If the algorithm of the present invention is run for N scheduling iterations, where N is the size of the switch, the algorithm converges to a maximal matching. As such, the algorithm is formally unstable. However, if the weights are chosen uniformly at random from a certain range, it can be shown that in O(log N) iterations, the algorithm converges to a matching whose weight is at least half the weight of the maximum weight matching. Further, it is contemplated that the algorithm finds good matchings if the weight matrix is doubly stochastic.

I. Choosing the Weights

The algorithm of the present invention includes a number of embodiments for representing the weights computed for the respective port pairs (i,j). The disclosed embodiments include a queue-length-based embodiment, a delay guarantee embodiment, a combined queue length and delay embodiment, and an embodiment based solely on delay but giving weight to fuller envelopes. Each of these embodiments is described below.

1. Queue Length Based Embodiment

In the queue length based scheme a weight is assigned to each input-output port pair (i,j) as:

$$w_{ij} = [\log_2(q_{ij})+1] - K \qquad \text{Eq. 1}$$

where $q_{ij}$ is the number of bytes arriving at input channel I destined for output channel J. K is the logarithm of the number of bytes in the smallest packet. For an IP data packet, K+5. This embodiment can be implemented by maintaining the queue length of each VOQ at each input port. The weight is just the position of the most significant bit in the binary representation of the queue length.

2. Delay Guarantee Embodiment

In this embodiment, the delay associated with the head of line (HOL) envelope can be maintained by noting the number of scheduling iterations that have occurred since the HOL packet in the HOL envelope arrived. This value is denoted as $d_{ij}$ for virtual output queue (VOQ) J at input I. In this embodiment, a threshold is set on the tolerable delay, then if the delay, $d_{i,j}$, exceeds the threshold $$d_{ij} > T \qquad \text{Eq. 2}$$

$w_{ij}$ is set to a user defined maximum value, otherwise $w_{ij}$ is computed as described by Equation 1 above.

3. Linear Combination of Qlength and Qdelay Embodiment

In this embodiment, the weight, $w_{ij}$, is computed as a linear combination of a queue length scheme, as defined by equation 1, and a delay scheme. By increasing the weight given to delay, the tail of the delay distribution may be bound at the expense of the mean delay seen by all data packets. The weight, $w_{ij}$, is computed as:

$$w_{ij} = [\log_2(d_{ij})] + K' + [\log_2(q_{ij})+1] - K \qquad \text{Eq. 3}$$

where $d_{ij}$ is the delay of the HOL packet in terms of scheduling iterations, and $K'=[\log_2 E]-K$. Where E is the number of of bytes per envelope, and K is described as above. This embodiment is formally stable with a finite waiting time for all data packets.

4. Delay Embodiment Giving Weight to Fuller Envelopes

In this embodiment, the weight, $w_{ij}$, is based solely on delays but gives greater weight to fuller envelopes, computed as $$w_{ij} = [\log_2(d_{ij})] + [\log_2(e_{ij}) - K] \qquad \text{Eq. 4}$$

where $e_{ij}$ is the number of bytes in the HOL envelope, and K is as defined above. This embodiment has been shown to be formally stable with finite waiting times for all data packets.

II. Hardware Implementation

General Overview

The scheduling algorithm of the present invention may be easily implemented on a field programmable gate array (FPGA). It is assumed that the weights can be specified with a small number of bits. The proposal and accept phases discussed above require a log N depth comparator tree. Masking bits are required to determine which inputs and outputs have been chosen in previous iterations. Assuming all the weights are stored on the FPGA, each phase can be implemented in one clock cycle.

In one hardware implementation, it has been shown that for an 8×8 switch, assuming the weights are specified by 4 bit numbers, each phase takes around 30 nanoseconds. Assuming the envelope size is the size of the largest packet in the system (e.g., 1500 bytes) and assuming a 40 Gbps line, each scheduling phase is approximately 300 nanoseconds. One drawback, however, is that all inputs must transmit every weight to the scheduler every scheduling phase, which requires either a large number of I/O pins or a large number of clock cycles. This drawback may be overcome by performing the propose phase on the input line cards. The scheduler receives from each input, its proposed output and its weight. The scheduler performs the accept phase, and notifies each input of the matching determined in that phase. Each unmatched input masks out the matched outputs and continues proposing to the unmatched outputs. This configuration is easily achieved in state of the art FPGA's.

For a 16×16 switch, assuming the weights are 4 bits each, 4 iterations of the algorithm are performed, approximately 160 I/O pins are required on the FPGA. Each scheduling iteration would require approximately 50 nanoseconds, which translates into a scheduling time of 200 nanoseconds. This configuration is easily achieved in state of the art FPGA's.

First and Second Hardware Embodiments

Two embodiments for implementing the scheduling method of the present invention are now described. A first embodiment which requires a larger amount of logic, and a second embodiment, which is a pipelined implementation requiring less logic and is slower in execution speed than the first embodiment.

The two hardware embodiments for implementing the inventive scheduling method will be described in the context of an example.

EXAMPLE

To illustrate the two hardware embodiments, suppose a weight matrix is given as shown in Table 1.

TABLE 1

|  | Input 1 | Input 2 | Input 3 |
| --- | --- | --- | --- |
| Output 1 | 0 | 2 | 0 |
| Output 2 | 9 | 7 | 0 |
| Output 3 | 0 | 4 | 2 |

Where each element of the weight matrix represents a weighting between an input-output pair. For example, the weighting between input 1 and output 2 is 9.

In accordance with the inventive scheduling method as described above, each unmatched input proposes to its highest weight unmatched output. In a first iteration of the scheduling method all inputs and outputs are initially unmatched. In accordance with the inventive scheduling method, input 1 proposes to its highest weight unmatched output, i.e., output 2, having a pair weighting of 9; input 2 proposes to its highest weight unmatched output, i.e., output 2 having a pair weight of 7, and input 3 proposes to its highest weight unmatched output i.e., output 3 having a pair weight of 2. Next, each output looks at its proposals and accepts the highest weight input. In the present example, with regard to outputs 1 and 3, output 1 receives no proposals and output 3 receives a single proposal from input 3 and accepts the proposal. Output 2 receives two proposals, i.e., a proposal from inputs 1 and 2. Output 2 accepts the proposal from input 1 on the basis of having the higher weight pair, i.e., 9. Therefore after the first iteration, input 1 is matched to output 2 and input 3 is matched to output 3. At the end of the first iteration, inputs 1 and 3 and outputs 2 and 3 are masked out as they are no longer considered candidates for pairing. Accordingly, the weight matrix passed on to the second iteration is illustrated in Table 2, reflects the masking operation and is:

TABLE 2

|  | Input 1 | Input 2 | Input 3 |
| --- | --- | --- | --- |
| Output 1 | x | 2 | x |
| Output 2 | x | x | x |
| Output 3 | x | x | x |

Where x denotes entries that are masked because their corresponding input or output is part of a connection chosen in a previous iteration.

First Hardware Embodiment

Figure 2A:
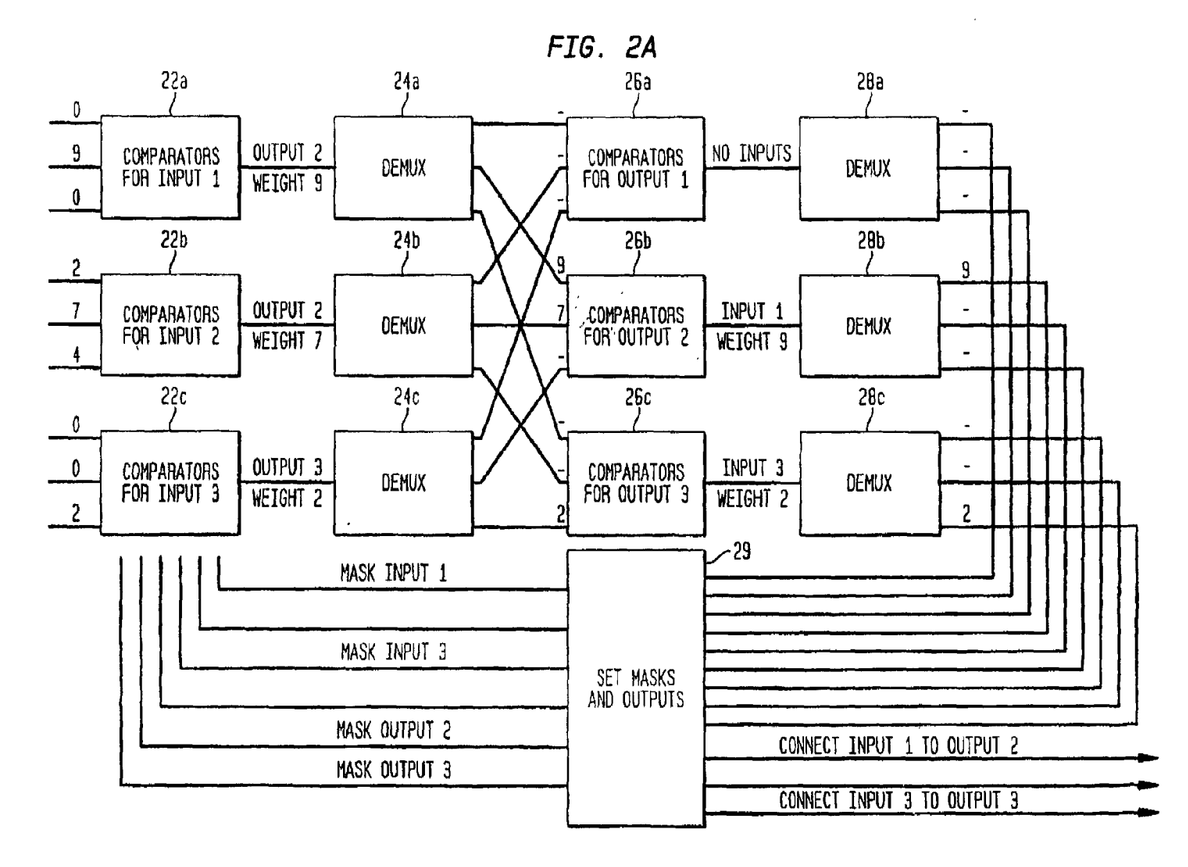
FIG. 2 is an illustration of a first hardware embodiment of the inventive switching method.
Figure 2B:
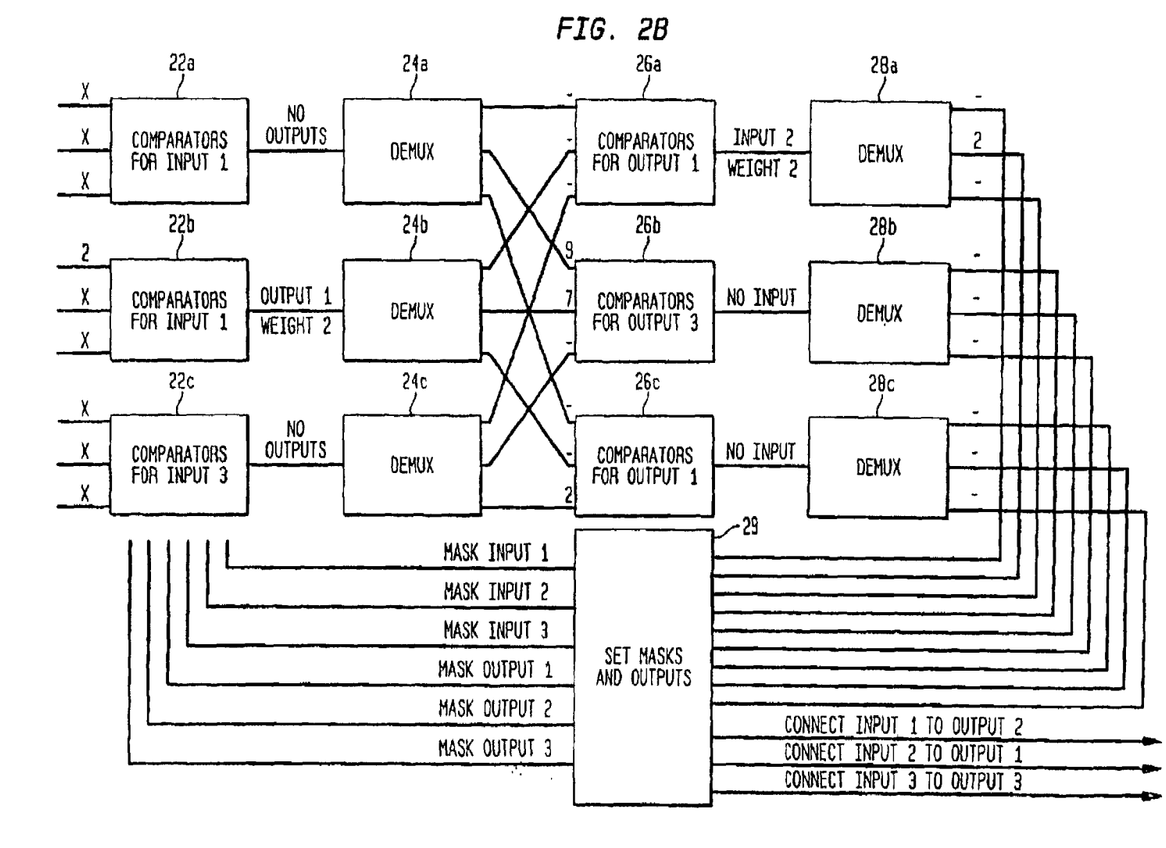

Referring now to FIGS. 2a and 2b, the first hardware embodiment is illustrated. In this embodiment it is assumed that all $N^2$ weights are available at all times. For simplicity and ease of explanation the hardware illustration shows a 3×3 switch.

Referring first to FIG. 2a, the hardware can be considered to be made up of five stages. In stage 1, a set of comparators 22a–22c are utilized to allow each input to choose its highest weight output. In the example, a first input comparator 22a, chooses the second output, i.e., output 2, as the highest weight output, i.e., 9. In a similar fashion, comparator 22b also chooses the second output, output 2, as the highest weight output, i.e., 7 and comparator 22c chooses the third output, i.e., output 3, as the highest weight output, i.e., 2. In stage 2, the outputs from the first stage 1 are demultiplexed by demultiplexers 24a–24c. Demultiplexer 24a directs the input weight value, i.e., weight 9, to the appropriate output comparator 26b as determined by input comparator 22a Also, demultiplexer 24a outputs null values to comparators 26a and 26c, respectively. Similarly, demultiplexer 24b outputs its input weight value, i.e., weight 7, to the appropriate output comparator 26b as determined by input comparator 22b. Also, demultiplexer 24b outputs null values to comparators 26a and 26c, respectively. Demultiplexer 24c outputs its weight value, i.e., weight 2, to the appropriate output comparator 26c. Also, demultiplexer 24a outputs null values to output comparators 26a and 26b, respectively. Next, comparators 26a–c select their respective highest weight input to be transmitted as output to respective demultiplexers 28a–28c. All three inputs to comparator 26a are null. As such, comparator 26a outputs a null value as input to demultiplexer 28a. Similarly, output comparator 26b selects input 1 as having the highest weight input, i.e., weight 9. The input/weight pair is output to demultiplexer 28b. Comparator 26c selects input 3 as having the highest weight value, i.e., 2, as input to demultiplexer 28c. Demultiplexers 28a–28c output the weight value on the associated input line. For example, demultiplexer 28b outputs weight 9 on input line 1 and outputs null values for input lines 2 and 3, respectively. The set mask/output module 29 sets masks for each input/output paired in the previous iteration and physically connects those input/output pairs to prevent those input/outputs from being paired in subsequent iterations.

Referring now to FIG. 2b, a second iteration for the fast implementation is shown. In the second iteration, inputs to comparators 22a–22c are obtained from the output of set mask/output module 29 from the previous iteration. In the example, all inputs are masked with the exception of the first input, i.e., 2, to comparator 22b. In this iteration, the process steps are similar to that described above in the first iteration. Further, in this iteration a further matching occurs. That is, input 2 is matched to output 1. At the end of this iteration it is determined by set mask/output module 29 that all input/output pairs have been matched and as such no further iterations are required.

It is noted that in the present embodiment, only one clock cycle is required for each iteration to set the matching on the output wires.

Second Hardware Embodiment

A drawback associated with the first embodiment (i.e., fast implementation) is that all the $N^2$ weight values of the weight matrix are required to be passed to the circuit simultaneously. If the entries arrive from an off-chip source then a bandwidth of $N^2$ time the rate at which the matchings need to be calculated which may be prohibitively large.

Figure 3:
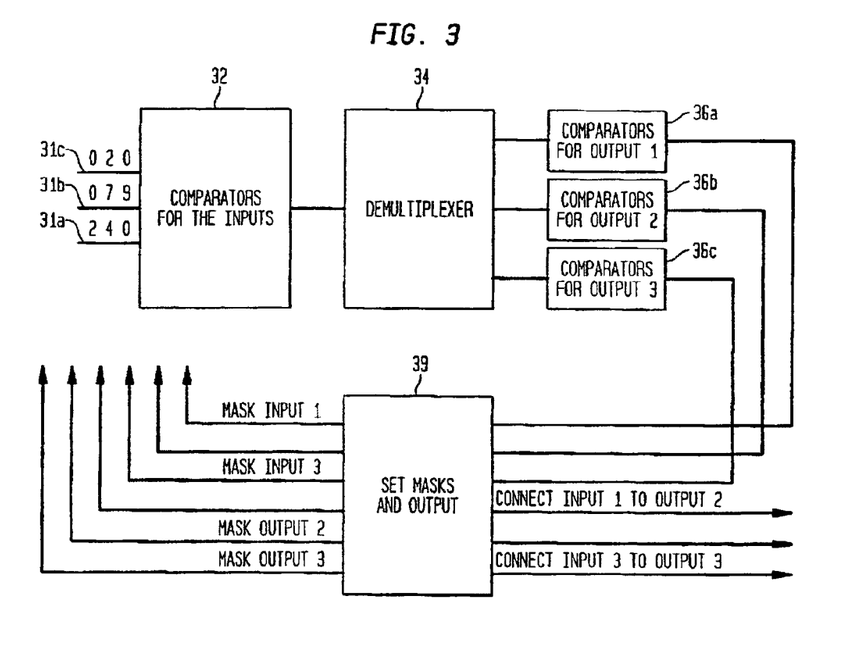
FIG. 3 is an illustration of a second hardware embodiment of the inventive switching method.

FIG. 3 illustrates a second hardware embodiment which overcomes the bandwidth limitations of the first hardware embodiment. In the present embodiment, the N weight entries are pipelined to the hardware at once. Advantageously, the pipelined configuration of the present embodiment requires less logic than the first embodiment. For simplicity and ease of explanation the hardware illustrations show a 3×3 switch.

With continued reference to FIG. 3, the hardware can be considered to be made up of four stages.

Figure 4:
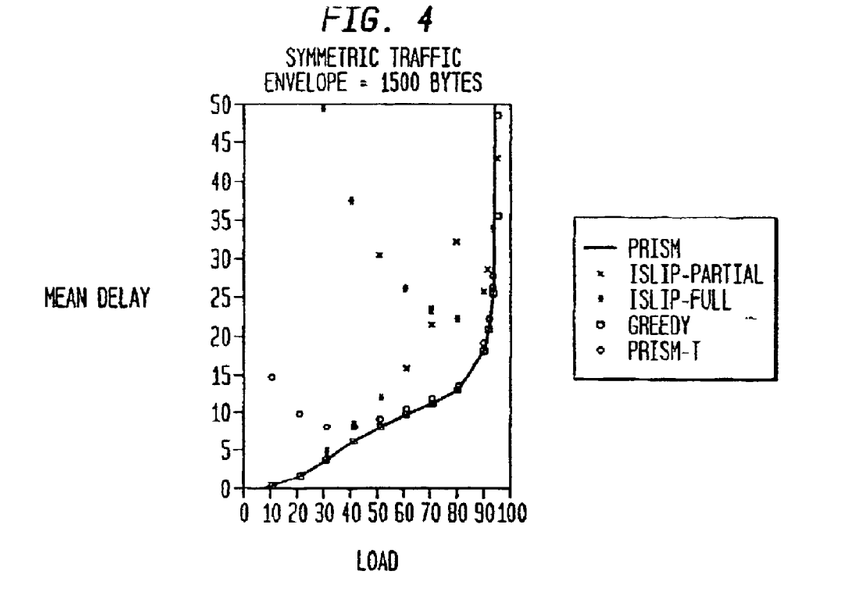
FIGS. 4–14 are illustrations of various simulation results of the scheduling algorithm according to the present invention.
Figure 5:
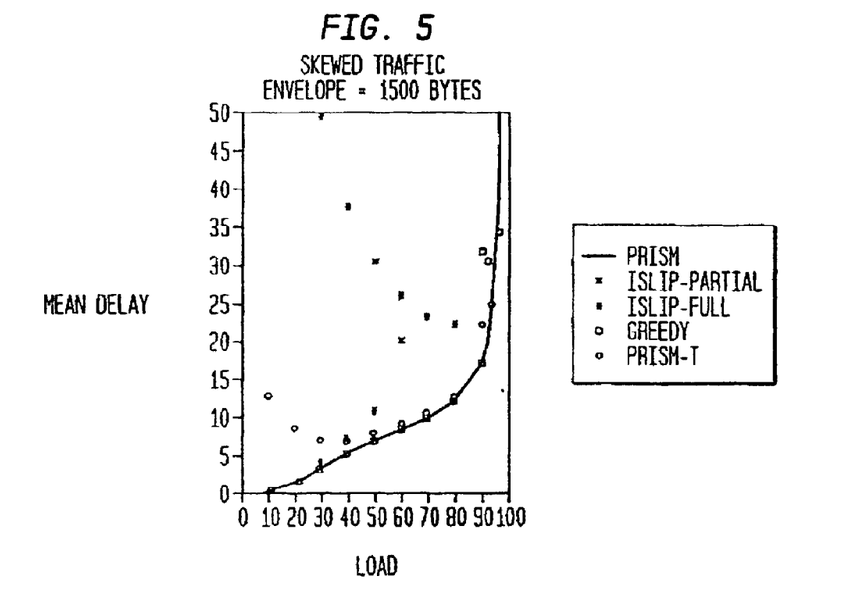
Figure 6:
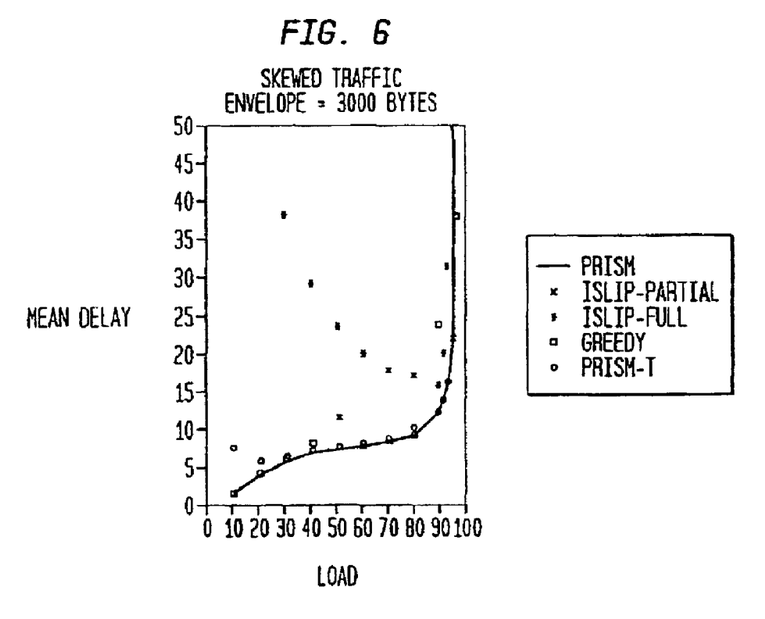
Figure 7:
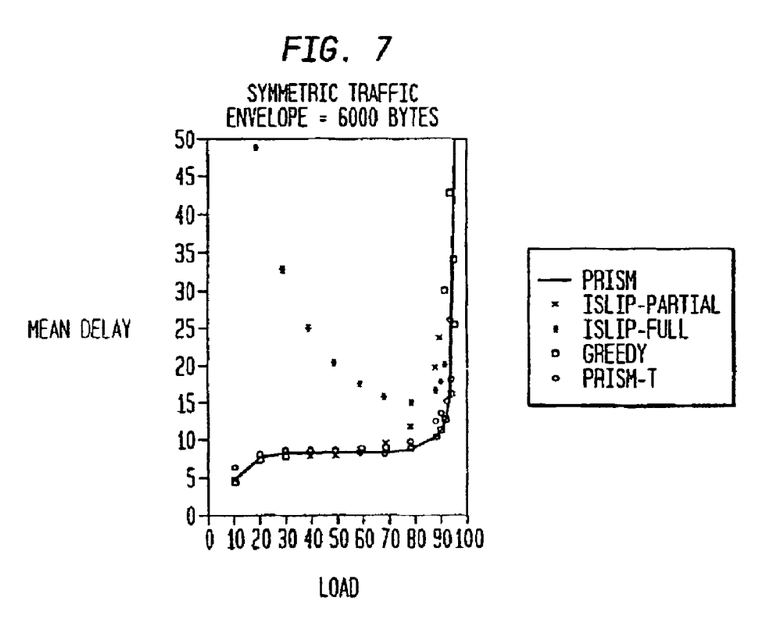
Figure 8:
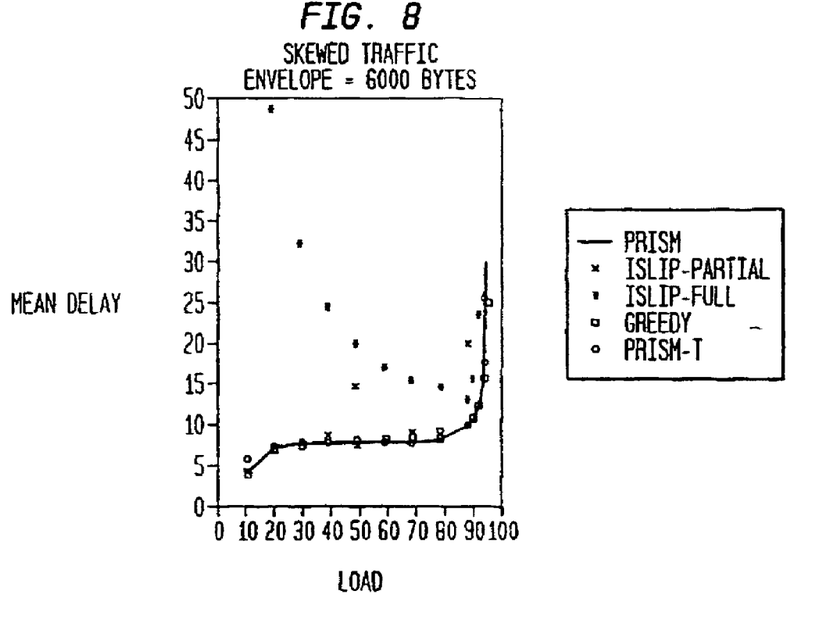
Figure 9:
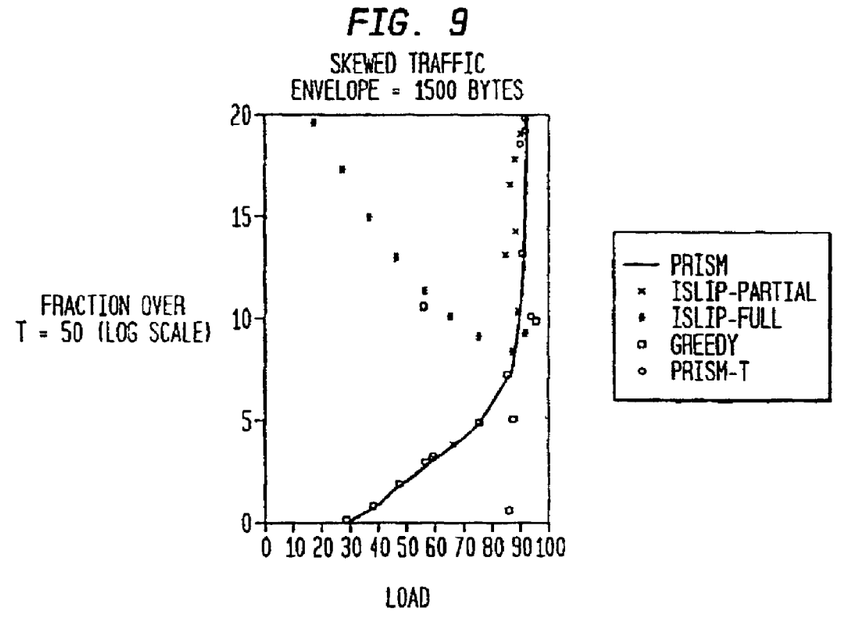
Figure 10:
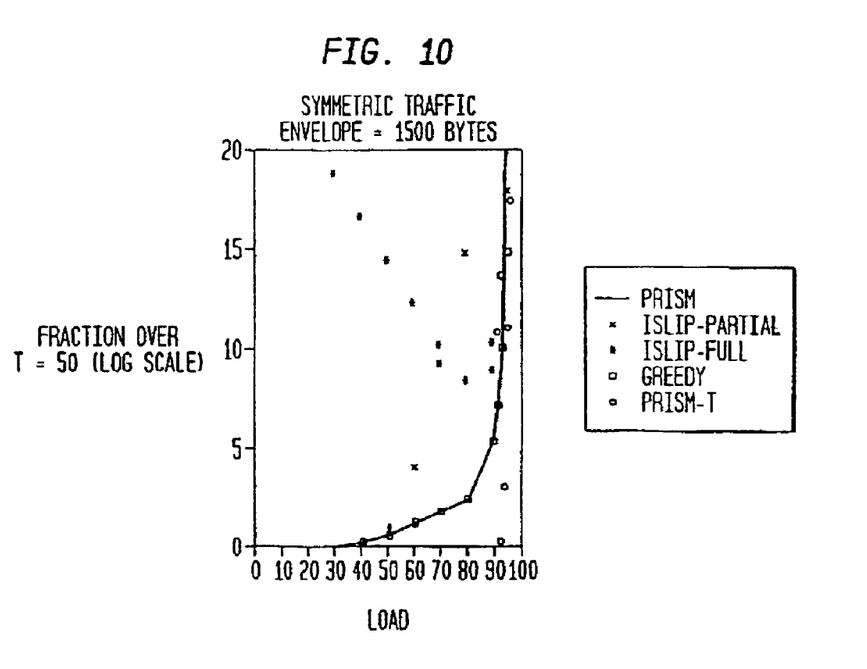
Figure 11:
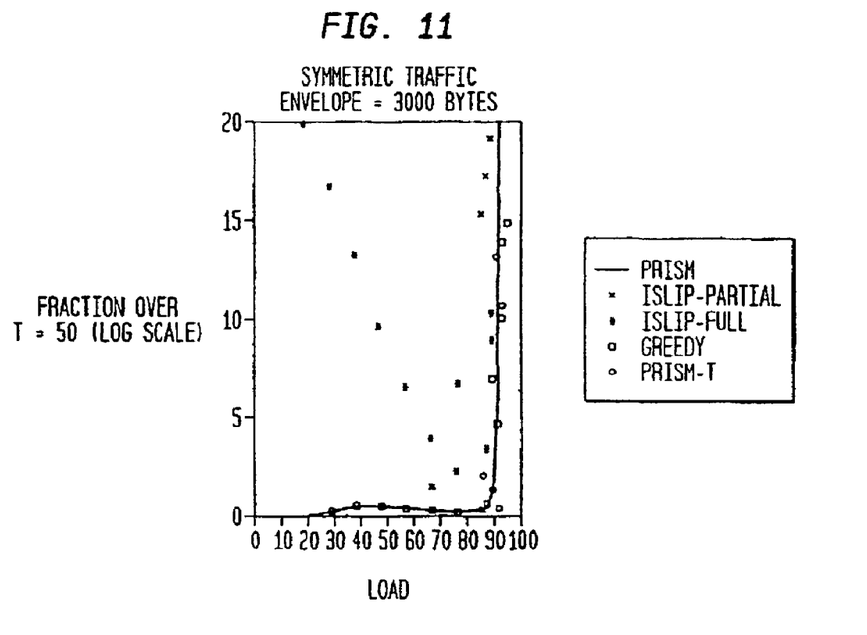
Figure 12:
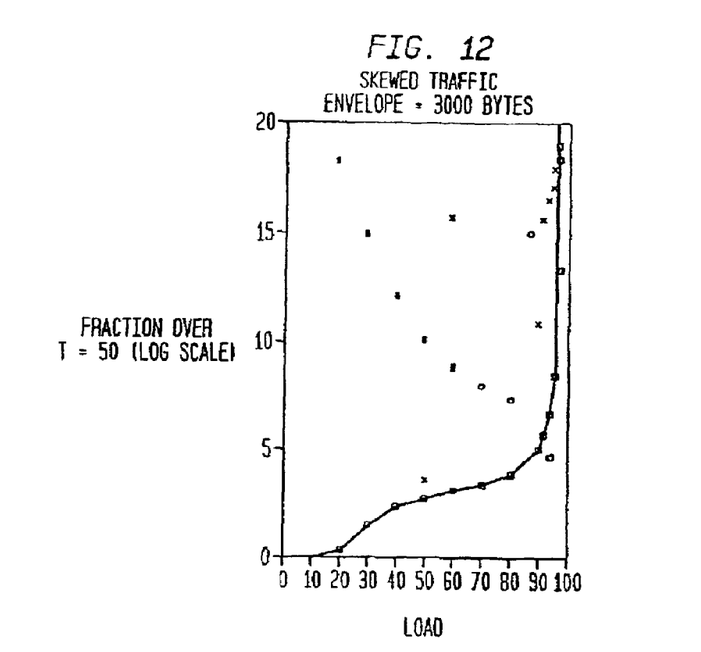
Figure 13:
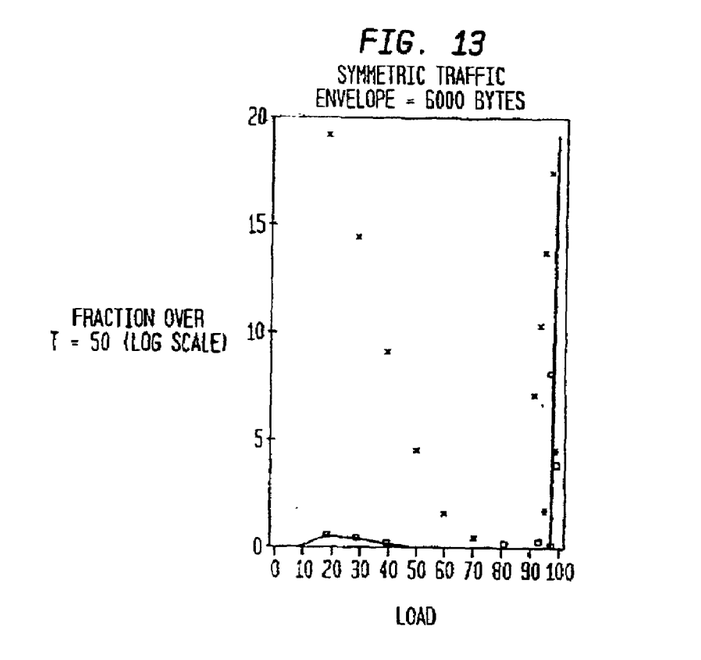
Figure 14:
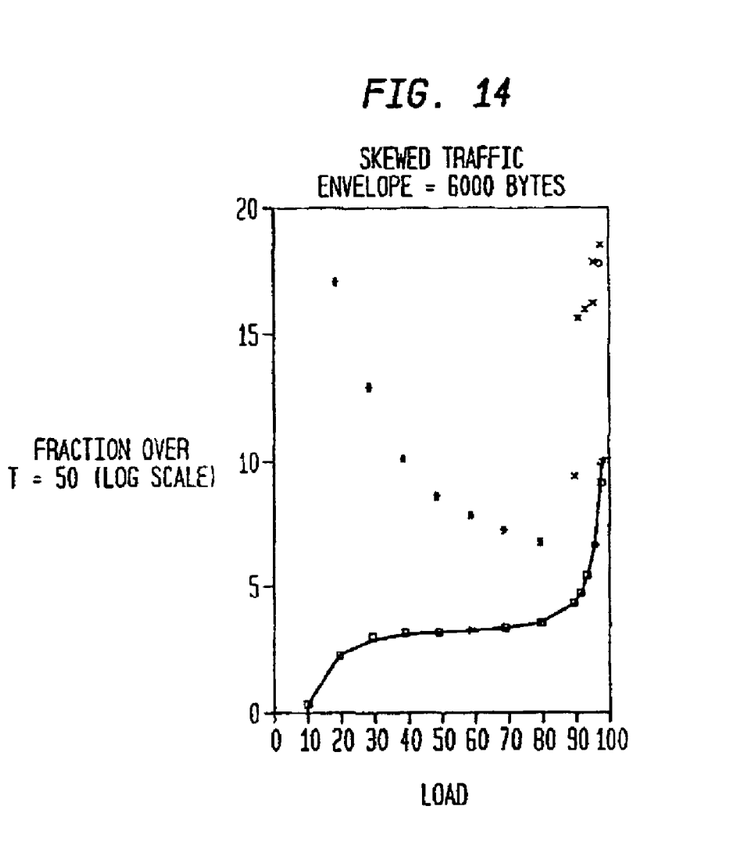

In stage 1, a single input comparator 32 is utilized. The single comparator 32 provides advantages over circuit configurations of the prior art by requiring only N inputs which receive the calculated weight values in parallel. In the example illustrated in FIG. 4, at each clock cycle comparator 32 receives three weight values in parallel where at the first clock cycle the three input values shown, i.e., (0,9,0) shown on respective input lines 31a, 31b and 31c correspond to the calculated weight values for the respective input/output pairs: (1/1),(1/2), and (1/3). That is, input/output pair (1/1) has a calculated weight of zero, input/output pair (1/2) has a calculated weight of 9, and input/output pair (1/3) has a calculated weight of zero. As shown, for the next or second clock cycle, the calculated weight values for input/output pairs: (2/1, 2/2 and 2/3) are shown to be 2, 7 and 4, respectively.

In stage 2, at each clock cycle, the comparator output is demultiplexed by demultiplexer 34 such that the highest weight value from among the three input values, e.g., (0,9,0) is output on the corresponding output line of the demultiplexer 34. In addition, the demultiplexer 34 outputs null values on each of the other output lines. In the example illustrated by FIG. 4, at the first clock cycle, demultiplexer 34 selects the highest weight, i.e., 9, corresponding to input/output pair (1/2).

In stage 3, another set of comparators 34a–34c are utilized to allow each output to choose the highest weight input among the non-null weights presented to it. In stage 3, the set of comparators 36a–36c, each of which is associated with a respective output port of the switch configuration, receives after a number of successive iterations or clock cycles, a complete row of the weight matrix as modified by the demultiplexer 34. For example, FIG. 3 shows that comparator 36a receives three null values over three iterations or clock cycles, comparator 36b receives the values (9, 7, null) over three successive clock cycles, and comparator 36c receives the values (null, null, 2) over three successive clock cycles. The non-null values represent the highest calculated weight between an input/output port pair in a particular clock cycle. The non-null values translate into an input port request for a match with an unmatched output port. Before a match can occur, however, it is required that each output port evaluate each non-null value and select the input port having the highest overall non-null value or weighting. This process of selecting the highest overall non-null weighting is accomplished by comparators 36a–36c. For example, comparator 36b receives in three successive clock cycles, the values (9, 7, null) which represent the weighting between input/output pairs (1/2, 2/2, 3/2), respectively. At the end of the third or final clock cycle, comparator 36b selects input/output pair (2/1) as a match based on a determined maximum weight value, i.e., max[9, 7, null]. An identical selection process occurs at the end of the third clock cycle for comparators 36a and 36c. It is noted that the process of selecting a matching input by comparators 36a–36c does not occur until the entire weight matrix is transferred (e.g., at the end of the third clock cycle).

In stage 5, the matching is placed on output wires and the input and output ports are masked out by set mask/output module 39 to prevent them from being chosen in subsequent iterations. It is noted that in the present embodiment, only one clock cycle is required for each iteration to set the matching on the output wires.

III. Simulation Studies

The performance of certain embodiments of the scheduling method of the present invention was compared with that of Islip and the Greedy algorithm. It was determined that for large envelope sizes, weight-based scheduling approaches, such as the scheduling method of the present invention provide superior performance over non-weight based approaches, such as Islip. It was further determined that the weight based scheduling method of the present invention was superior to the weight based Greedy algorithm in that the Greedy algorithm is inherently sequential in nature, which is undesirable for a hardware implementation. In the Greedy algorithm each input sequentially computes a highest calculated weight for various outputs. The algorithm of the present invention is essentially a parallelized version of the Greedy algorithm.

A simulation was performed on a 16×16 switch, with 4 iterations for both the scheduling method of the present invention and Islip. The loading was chosen to be random across all port pairs, in addition to being a random doubly stochastic matrix. The traffic was selected to be Poisson distributed. The selected data packet sizes include 60% of data packets of size 44 bytes, 20% of 552 byte data packets and 20% of 1500 byte data packets.

FIGS. 4–13 illustrate simulation results which characterize the performance of the different scheduling methods for various envelope sizes (i.e., 1500 bytes, 3000 bytes and 6000 bytes). FIGS. 5–10 illustrate simulation results for the queue length based embodiment, as described by equation 1 above, and FIGS. 11–14 illustrate simulation results for the delay embodiment giving weight to fuller envelopes described above (i.e., delay scheme giving weight to fuller envelopes).

It will be understood that various modifications may be made to the embodiments disclosed herein, and that the above descriptions should not be construed as limiting, but merely as exemplifications of preferred embodiments. Those skilled in the art will envision other modifications within the scope and spirit of the claims appended hereto.

What is claimed is:

1. A method for scheduling arriving data packets for input to a switch having a plurality of input channels and a plurality of output channels, the method comprising the steps of:

receiving at one or more of said plurality of input channels, one or more data packets destined for transmission to one of said plurality of output channels wherein each of said plurality of input and output channels are classified as unmatched prior to a first scheduling iteration; and storing said one or more received data packets into at least one data scheduling envelope associated with each of said one or more input channels;

assigning a channel pair weight to unmatched input-unmatched output channel pairs having at least one data scheduling envelope storing one or more data packets, wherein the channel pair weight is computed such that it depends on a delay value of a first received data packet in the associated at least one data scheduling envelope;

sending a match request from each unmatched input channel to an unmatched output channel having a highest channel pair weight therebetween; and accepting a match request at each unmatched output channel from an unmatched input channel whose assigned channel pair weight therebetween is determined to be highest from among all received match requests.

2. The method of claim 1 wherein the step of assigning a channel pair weight to unmatched input-unmatched output channel pairs further includes the steps of:

for each unmatched input-output channel pair:
determining a number of bytes to be transmitted therebetween;
determining a delay value associated with a received data packet having a highest time-stamp to be transmitted therebetween; and
computing an assigned channel pair weight as a linear combination of said determined number of bytes and said determined delay.

3. The method of claim 1, wherein the steps of assigning a channel pair weight, sending a match request, and accepting a match request are performed in successive scheduling phases.

4. The method of claim 3, wherein each scheduling phase comprises at least log N scheduling iterations.

5. A method for scheduling arriving data packets for input to a switch having a plurality of input channels, i=1 . . . N, and a plurality of output channels, j=1 . . . N, each of said plurality of input channels being further comprised of N virtual output queues, VOQs (i,j), for buffering at least one data packet P(i,j) received on the ith input channel destined for the jth output channel, the method comprising the steps of:

receiving said at least one data packet, P(i,j), received at said ith input channel destined for said jth output channel;

storing said at least one received data packet, P(i,j), in an ith channel data scheduling envelope associated with a virtual output queue VOQ(i,j), wherein a first scheduling envelope at said VOQ(i,j) is a head-of-line data scheduling envelope and a first stored data packet in said head-of-line data scheduling envelope is a head-of-line packet;

assigning a weight, $w_{ij}$, to each non-empty head-of-line scheduling envelope for each unmatched input channel wherein the weight is computed such that it depends on a delay value of a head-of-line packet;

sending a match request from each unmatched input channel to an unmatched output channel whose assigned weight $w_{ij}$ therebetween is highest;

determining at each of said unmatched output channels a highest assigned weight $w_{ij}$ from among all received input channel match requests; and granting at each of said unmatched output channels a match request to an input channel whose determined assigned weight $w_{ij}$ therebetween is highest.

6. The method of claim 5 wherein the step of assigning a weight to each non-empty virtual output queue VOQ(i,j) for each unmatched ith input channel further comprises the step of computing said assigned weight as:

$$w_{ij}=[\log_2(q_{ij})+1]-K$$

where $q_{ij}$ is the number of bytes arriving at an input channel from among said plurality of input channels destined for output channel from among said plurality of output channels, and K is the logarithm of the number of bytes in a smallest received packet.

7. The method of claim 5 wherein the step of assigning a weight to each non-empty virtual output queue VOQ(i,j) for each unmatched ith input channel further comprises the steps of:

determining a delay $d_{ij}$ as a number of said at least log N scheduling iterations which have passed, as measured from a point at which a head-of-line (HOL) data packet is received in a HOL envelope at said non-empty virtual output queue VOQ(i,j);

assigning a maximum weight $w_{ij}(max)$ to said virtual output queue VOQ(i,j) if said delay $d_{ij}$ exceeds a predetermined threshold; and otherwise computing said assigned weight as:

$$w_{ij}=[\log_2(q_{ij})+1]-K$$

where $q_{ij}$ is the number of bytes arriving at input channel destined for output channel, and K is the logarithm of the number of bytes in a smallest received packet.

8. The method of claim 5 wherein the step of assigning a weight to each non-empty virtual output queue VOQ(i,j) for each unmatched ith input channel further comprises the step of computing said assigned weight as:

$$w_{ij}=[\log_2(d_{ij})]+K'$$

where $d_{ij}$ is the delay of a head-of-line (HOL) data packet in a HOL envelope at VOQ(i,j), and $$K'=[\log_2[E]]-K$$

where

E is the number of bytes per envelope, and

K is the logarithm of the number of bytes in a smallest received packet.

9. The method of claim 5 wherein the step of assigning a weight to each non-empty virtual output queue VOQ(i,j) for each unmatched ith input channel further comprises the step of computing said assigned weight as:

$$w_{ij}=[\log_2(d_{ij})]+[\log_2(e_{ij})-K]$$

where $e_{ij}$ is the number of bytes in a head-of-line (HOL) envelope;

$d_{ij}$ is the delay of a HOL data packet in a HOL envelope at VOQ(i,j); and

K is the logarithm of the number of bytes in a smallest received packet.

10. The method of claim 5, wherein the steps of assigning a weight, sending a match request, determining a highest assigned weight, and granting a match request are performed in successive scheduling phases.

11. The method of claim 10, wherein each scheduling phase comprises at least log N scheduling iterations.

12. Apparatus for scheduling arriving data packets for input to a switch having a plurality of input channels and output channels, each of said plurality of input channels being further comprised of J virtual output queues, VOQs (i,j), for buffering said data packets received on the ith input channel destined for the jth output channel, DP(i,j), the apparatus comprising:

means, associated with each input channel, for storing the data packets, DP(i,j), arriving at the associated input channel in at least one scheduling envelope residing at an associated VOQ(i,j);

means, associated with each input channel, for assigning a weight, $W_{ij}$, to each VOQ(i,j) having at least one non-empty scheduling envelope wherein the weight is computed such that it depends on a delay value of a first received data packet in the associated at least one data scheduling envelope;

means, associated with each input channel, having at least one VOQ(i,j) having an assigned weight, $W_{ij}$, for sending a request to the jth output having the highest assigned weight $W_{ij}$; and means, associated with each output channel J, for granting a request from an output channel J, responsive to said received input channel requests, to an input channel I having the highest assigned weight, $w_{ij}$.

13. The apparatus of claim 12, further including:

means, associated with each output channel, for matching an input-output channel pair wherein the input-output channel pair has the highest assigned weight, $W_{ij}$, therebetween.

14. The apparatus of claim 12, wherein the means for assigning a weight to each VOQ(i,j) further includes, means, associated with each VOQ(i,j), for determining a total number of bytes comprising said stored data packets arriving at the associated VOQ(i,j); and means, associated with each VOQ(i,j), for determining a delay associated with a head-of-line packet.

15. A switching apparatus for distributing data packets input from each of a plurality of input ports to a plurality of output ports, said switching apparatus comprising:

a comparator connected to simultaneously receive weight elements in successive clock cycle iterations, wherein the weight elements are computed such that they depend on a delay value of a first received data packet, said comparator configured to output a largest weight element from among the received weight elements in each clock cycle iteration;

a demultiplexer configured to receive said largest weight element from said comparator, said demultiplexer further configured to distribute said largest weight elements to output lines; and a plurality of comparators each configured to receive the largest weight elements from a corresponding output line of said output lines, each of said plurality of output comparators being further configured to output a largest weight element from among said received weight elements.

16. A switching apparatus for distributing data packets input from each of a plurality of input ports to a plurality of output ports, said switching apparatus comprising:

means for simultaneously receiving weight elements in successive clock cycle iterations wherein the weight elements are computed such that they depends on a delay value of a first received data packet;

means for outputting a largest weight element from among the received weight elements in each clock cycle iteration;

means for distributing said largest weight element from said outputting means; and output selection means for selecting the overall largest weight element from among a plurality of largest weight elements received from said distributing means.

* * * * *

UNITED STATES PATENT AND TRADEMARK OFFICE
CERTIFICATE OF CORRECTION

| | | |
|---|---|---|
| PATENT NO. | : 7,065,046 B2 | Page 1 of 1 |
| APPLICATION NO. | : 09/827999 | |
| DATED | : June 20, 2006 | |
| INVENTOR(S) | : D.M. Andrews et al. | |

It is certified that error appears in the above-identified patent and that said Letters Patent is hereby corrected as shown below:

Title Page In the "References Cited" section (56) on the first page:

Please insert the following:

--Scheduling Algorithms for Input-Queued Cell Switches by Nicholas William McKeown - thesis submitted in the Graduate Division of University of California, Berkley - 1995--

Signed and Sealed this

Twenty-first Day of November, 2006

JON W. DUDAS
*Director of the United States Patent and Trademark Office*